(12) United States Patent
Desmith et al.

(10) Patent No.: US 8,128,394 B2
(45) Date of Patent: Mar. 6, 2012

(54) INTERCHANGEABLE MOLD TOOLING

(75) Inventors: Brian L. Desmith, Oxford, MI (US);
Wilfried Mozer, Warren, MI (US);
Jeffrey R. Zawacki, Channahon, IL (US)

(73) Assignee: Delta Engineered Plastics, Auburn Hills, MI (US)

( * ) Notice: Subject to any disclaimer, the term of this patent is extended or adjusted under 35 U.S.C. 154(b) by 0 days.

(21) Appl. No.: 12/934,738

(22) PCT Filed: Mar. 26, 2009

(86) PCT No.: PCT/US2009/038358
§ 371 (c)(1),
(2), (4) Date: Dec. 23, 2010

(87) PCT Pub. No.: WO2009/120838
PCT Pub. Date: Oct. 1, 2009

(65) Prior Publication Data
US 2011/0115117 A1   May 19, 2011

Related U.S. Application Data

(60) Provisional application No. 61/039,587, filed on Mar. 26, 2008.

(51) Int. Cl.
*B29C 45/10* (2006.01)
*B29C 33/38* (2006.01)
*B23P 11/00* (2006.01)

(52) U.S. Cl. ............ 425/192 R; 264/328.16; 29/525.01; 29/426.2

(58) Field of Classification Search ............... 425/192 R; 264/328.16; 29/525.01, 426.2
See application file for complete search history.

(56) References Cited

U.S. PATENT DOCUMENTS

| 3,694,529 A | 9/1972 | Josephsen et al. |
| 3,773,873 A | 11/1973 | Spaak et al. |
| 4,133,858 A | 1/1979 | Hayakawa et al. |
| 4,164,523 A | 8/1979 | Hanning |
| 4,416,604 A | 11/1983 | Bender et al. |
| 4,446,185 A | 5/1984 | Waragai et al. |

(Continued)

FOREIGN PATENT DOCUMENTS

EP    0 481 306    4/1992

(Continued)

OTHER PUBLICATIONS

Web page printed out on Feb. 16, 2010 from Intellimold—http://www.intellimold.com/getpage.asp? pg=xtralite-01&mn=otherapps Published Jul. 26, 2003—2 pages.

(Continued)

*Primary Examiner* — Joseph Del Sole
*Assistant Examiner* — Kimberly A Stewart
(74) *Attorney, Agent, or Firm* — Brooks Kushman P.C.

(57) ABSTRACT

Tooling assemblies for interfacing with interchangeable molds are provided, each with a tooling body for mounting to a platen of a press of an injection molding machine and for receiving an interchangeable mold block. Interchangeable mold blocks are also provided for forming articles. A series of fasteners fasten each mold block to one of the tooling bodies. Alignment systems are oriented within a perimeter of the mold block to permit expansion of the mold block relative to the tooling body to accommodate varying rates of thermal expansion of the tooling body and the mold block. Methods for assembling a mold, molding an article and interchanging a mold with interchangeable mold blocks are also provided.

17 Claims, 11 Drawing Sheets

U.S. PATENT DOCUMENTS

| | | | |
|---|---|---|---|
| 4,479,914 | A | 10/1984 | Baumrucker |
| 4,500,274 | A | 2/1985 | Cyriax et al. |
| 4,544,340 | A | 10/1985 | Hehl |
| 4,572,856 | A | 2/1986 | Gembinski |
| 4,737,540 | A | 4/1988 | Yoshida et al. |
| 4,892,770 | A | 1/1990 | Labrie |
| 5,037,687 | A | 8/1991 | Kargarzadeh et al. |
| 5,078,586 | A * | 1/1992 | Holzschuh ............... 425/192 R |
| 5,093,053 | A | 3/1992 | Eckardt et al. |
| 5,114,330 | A | 5/1992 | Nielsen |
| 5,282,733 | A | 2/1994 | Noritake et al. |
| 5,403,647 | A | 4/1995 | Kaneishi et al. |
| 5,424,112 | A | 6/1995 | Kataoka et al. |
| 5,441,680 | A | 8/1995 | Guergov |
| 5,449,698 | A | 9/1995 | Mabuchi et al. |
| 5,566,743 | A | 10/1996 | Guergov |
| 5,662,841 | A | 9/1997 | Guergov |
| 5,716,561 | A | 2/1998 | Guergov |
| 5,728,329 | A | 3/1998 | Guergov |
| 5,731,013 | A | 3/1998 | vanderSanden |
| 5,785,110 | A | 7/1998 | Guergov |
| 5,863,487 | A | 1/1999 | Guergov |
| 5,900,198 | A | 5/1999 | Hori |
| 5,985,188 | A | 11/1999 | Jennings et al. |
| 6,019,918 | A | 2/2000 | Guergov |
| 6,103,154 | A | 8/2000 | Branger et al. |
| 6,196,824 | B1 | 3/2001 | Foltuz et al. |
| 6,206,674 | B1 | 3/2001 | Foltuz et al. |
| 6,328,552 | B1 | 12/2001 | Hendrickson et al. |
| 6,419,289 | B1 | 7/2002 | Batten et al. |
| 6,531,087 | B1 | 3/2003 | Hendry |
| 6,589,458 | B2 | 7/2003 | DeCost |
| 6,645,587 | B1 | 11/2003 | Guergov |
| 6,863,329 | B2 | 3/2005 | Fero |
| 6,884,380 | B2 | 4/2005 | Yamaki |
| 6,918,169 | B2 | 7/2005 | Mathew |
| 6,921,571 | B2 | 7/2005 | Funakoshi |
| 6,994,814 | B2 | 2/2006 | Moriguchi et al. |
| 7,077,987 | B2 | 7/2006 | Yamaki et al. |
| 7,204,685 | B1 | 4/2007 | Crain et al. |
| 7,294,295 | B2 | 11/2007 | Sakamoto et al. |
| 2001/0021457 | A1 | 9/2001 | Usui et al. |
| 2001/0041245 | A1 | 11/2001 | Funakoshi |
| 2004/0013846 | A1 | 1/2004 | Kugimiya et al. |
| 2005/0127579 | A1 | 6/2005 | Suzuki |
| 2005/0230861 | A1 | 10/2005 | Takatori et al. |
| 2009/0246471 | A1 | 10/2009 | Zawacki et al. |

FOREIGN PATENT DOCUMENTS

| | | |
|---|---|---|
| EP | 0593308 | 4/1994 |
| EP | 0 925 895 | 6/1999 |
| GB | 1169394 | 11/1969 |
| JP | 56060239 | 5/1981 |
| JP | 7077739 | 8/1995 |
| JP | 10146872 | 6/1998 |
| JP | 11179752 | 7/1999 |
| JP | 2001322433 | 11/2001 |
| JP | 2007269002 | 10/2007 |
| KR | 10-2007-0034186 | 3/2007 |
| WO | 00/38899 | 7/2000 |
| WO | 00/38900 | 7/2000 |
| WO | 01/62486 | 8/2001 |
| WO | 02/078925 | 10/2002 |
| WO | 2009/120838 | 10/2009 |
| WO | 2009/120850 | 10/2009 |

OTHER PUBLICATIONS

Endex International, Inc. Endex Structural Foam Molding, General Information Guide, 22 pages, 2006.

Web page printed out on Jan. 21, 2008 from Caropreso Associates, www.caropresoassociates.com/paper2.html, Michael E. Reedy, "Chemical Foaming Agents Improve Performance and Productivity", 9 pages.

Kazmer, D., "Design with Plastics Focus: Injection Molding" 72 pages, web printout Nov. 24, 2008 from www.kazmer.uml.edu/staff/archive/2003/NMW Design with Plastics.pdf.

Web page printed out on Jan. 18, 2008 from www.bergeninternational.com/html/Molding.htm of Bergen International: Molding Tips, "Processing Tips", 5 pages.

Sporrer, A., et al., "Tailored Structural Foams by Foam Injection-Molding with a Specialized Mold", Department of Polymer Engineering, University of Bayreuth, Germany, SPE Foams Conference, 2006, Chicago, Illinois Sep. 12-14, 2006.

Web page print out on Jan. 21, 2008 from www.bergeninternational.com/html/product2.htm, of Bergen International: Processing Tips, "Product Guide", 5 pages.

Ampacet Bulletin, "Employee Azodicarbonamide as a Nucleating Agent in Thermoplastic Foams" from www.ampacet.com/EN/global/tutorials.html?lang=EN.

Ampacet Product Information sheet, "701039-H Foam EVA MB" dated Aug. 10, 2004.

Web page print out on Feb. 14, 2008 from www.iplas.com/USA, International Plastic Laboratories and Services, "Determining Clamp Requirements", 3 pages.

Sales Presentation Sheet, "Mucell Brings Two Key Strategic Benefits to our Key Targeted Markets", from www.trexcel.com/imsales_salesrepresentation, 2007, 44 pages.

Ranade, et al., "Structure-Property Relationships in Coextruded Foam/Film Microplayers", Journal of Cellular Plastics, vol. 40, Nov. 2004, pp. 497-505.

Web page printed out from www.CaropresoAssociates.com, Caropreso, "Molding with Counterpressure; A Cost Savings Option to Increase Productivity", 9 pages.

Ampacet Product Information sheet, "701253-W Foam PE MB", dated May 3, 2004.

Ampacet Product Information sheet, "10123 Foam PE MB", dated Apr. 29, 2004.

Ampacet Product Information sheet, "701054-S Foam EVA MB", dated May 3, 2004.

Ampacet Product Information sheet, "701709-H Foam PE MB", dated Oct. 20, 2004.

International Search Report for PCT/US2009/038358 dated Mar. 26, 2009.

International Search Report for PCT/US2009/038374 dated Mar. 26, 2009.

Bregar, Bill, Deal Adapts MuCell for Glossy Auto Parts, Plastics News, Nov. 15, 2010.

* cited by examiner

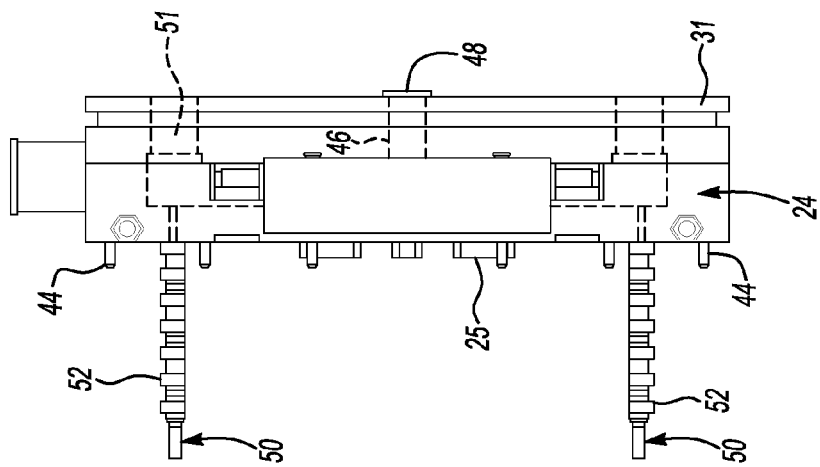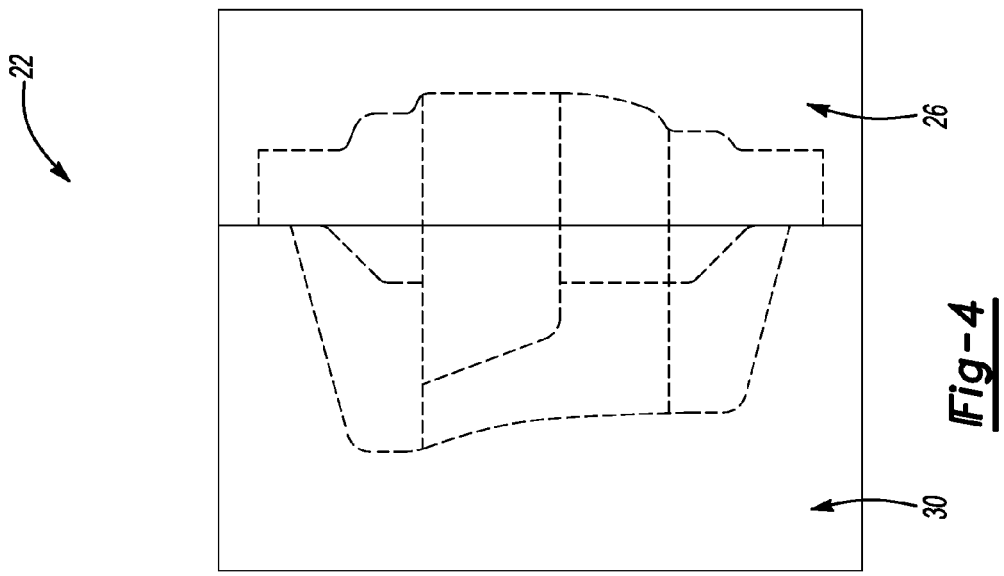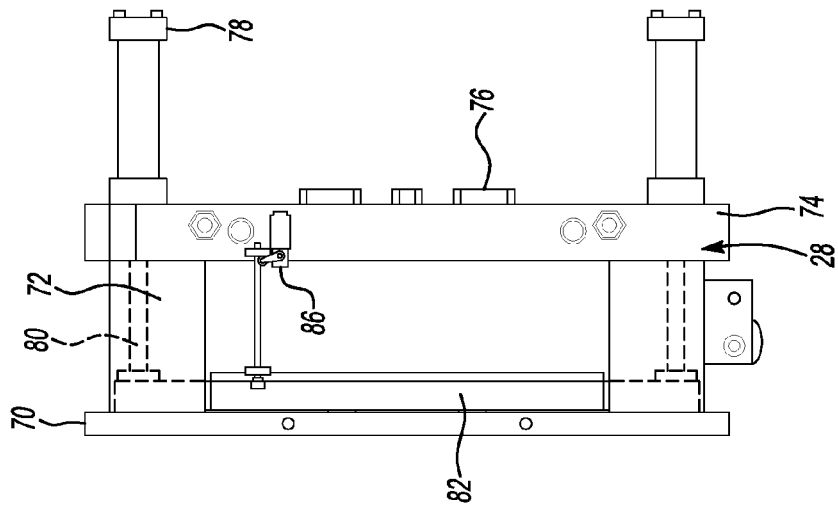
Fig-4

INTERCHANGEABLE MOLD TOOLING

CROSS-REFERENCE TO RELATED APPLICATIONS

This application claims the benefit of U.S. provisional application Ser. No. 61/039,587 filed Mar. 26, 2008, the disclosure of which is incorporated in its entirety by reference herein.

BACKGROUND

1. Technical Field

The invention relates to interchangeable and relatively inexpensive mold tooling for injection-molded articles.

2. Background Art

Existing molding technology has enabled the production of thin-wall commercial bumper fascias that are manufactured by the use of the reaction injection molding (RIM) method, the thermoplastic injection molding (TIM) method or the thermoformed sheet molding (TFSM) method. Large molded articles, such as bumper fascias for commercial trucks are extremely large compared to other molded components and require relatively large tooling to produce the parts. For example, commercial truck bumper fascias are generally eight feet wide, two feet high and three feet deep. These thin-wall articles are generally molded as one main piece with additional, smaller components assembled to the main part for strength and rigidity.

While all of the current production technologies are capable of molding the large fascia part, the parts that are produced do not have the inherent strength and stability to be mounted directly onto a vehicle. The parts from all of the molding technologies are very dependant on additional plastic and metal components such as reinforcements and braces to achieve the strength and the stability to enable them to be mounted onto a truck. In the case of the RIM parts, because of the fact that this is a very low pressure process, surface voids and porosities need to be filled before the parts are primed and painted. Since all of these technologies only produce an outer skin, a further drawback to the RIM fascias, the normal TIM fascias and the TFSM fascia parts is their fragility to impact failures when mounted on a vehicle. And finally, because of the additional components and labor that are necessary to complete these fascias, their costs need to be reflected in the final pricing of the subassemblies.

The mold tooling for a commercial truck fascia of this size, that is necessary to support these processes, is very large and unique to each manufacturing process in terms of complexity and the resultant expense. Beginning with the simplest and least expensive tooling for the TFSM method, progressing to the middle-priced low pressure tooling for the RIM method and finally to the most expensive high pressure molds for the TIM method, the number of incorporated part features that are possible to incorporate into the molded part increases from one process to the next with the very best features and molding materials being available from the TIM process. Since the RIM tooling and the TIM molds can provide similar features in the molded part, it becomes a natural desire to gain the benefits of the TIM process at the tooling price of the RIM molds, a combination that has not been possible previously. The financial implications of this disparity become even more severe when the production life of the tooling must be amortized over a relatively small number of parts that will be produced from that tooling over the limited life of the project.

TIM mold blocks for large articles such as commercial truck bumper fascias are expensive due to the size and the intricate design criteria. Additionally, the size of these mold blocks typically results in very limited portability, thereby often requiring dedicated tooling and possibly dedicated presses. When one mold for a commercial truck bumper fascia, in an injection press, is changed out for another commercial truck bumper fascia mold, dedicated tooling and plumbing are required. It is a very cumbersome and dangerous process to change over the molds and tooling, in an injection press, and requires a great deal of time resulting in significant costs associated with tooling, labor, and down time of the press.

The prior art has provided interchangeable molds for relatively smaller components. Such interchangeable molds are typically directed to molds that include multiple sub-molds, inserts, for molding multiple smaller articles in each cycle. The prior art interchangeable molds include an interchangeable insert that is constrained about its complete periphery where the host mold blocks provide for the complete interface with the injection-molding machine from the supply of all utility fluids and functions, the flow path of the molten material to the ejection system that removes the molded parts from the inserted cavities. In essence, the prior art interchangeable mold is assembled outside of the machine and is then installed into the molding machine as a functioning unit.

SUMMARY

One embodiment discloses a tooling assembly for interfacing with an interchangeable mold block. The tooling assembly has a tooling body with a first surface adapted to be mounted to a platen of a press of an injection molding machine and a second surface that is opposed from the first surface and adapted for receiving an interchangeable mold block mounted thereto. A series of fasteners are mounted on the second surface for fastening the mold block thereto. An alignment system is mounted on the second surface for aligning the mold block to the tooling body. The alignment system is oriented within a perimeter of the mold block to permit expansion of the mold block relative to the tooling body to accommodate varying rates of thermal expansion of the tooling body and the mold block.

Another embodiment discloses an interchangeable mold block for forming an article. The mold block has a mold block body with a first surface adapted to be mounted to a tooling assembly, a second surface that is opposed from the first surface for engaging another mold block body, and a forming surface for collectively forming an article with a forming surface of the other mold block body in a forming operation. A series of fasteners are mounted on the first surface for fastening the mold block body to the mold tooling assembly. An alignment system is mounted on the first surface for aligning the mold block to the mold tooling assembly. The alignment system is oriented within a perimeter of the mold block body to permit expansion of the mold block body relative to the mold tooling assembly to accommodate varying rates of thermal expansion of the mold tooling assembly and the mold block body.

Yet another embodiment discloses a method for assembling a mold by providing a first tooling assembly with a manifold, a series of drops extending therefrom in fluid communication with the manifold, a fastener system and an alignment system. The first tooling assembly is mounted to a stationary platen of a press of an injection molding machine. The manifold is connected to a source of heated resin of the injection molding machine. A first interchangeable mold block is provided with a series of input apertures, a fastener system and an alignment system. The first interchangeable mold block alignment system is aligned with the first tooling assembly alignment system within a perimeter of the first interchangeable mold block, thereby also aligning the first interchangeable mold block input apertures with the first tooling assembly drops. The first interchangeable mold block fastener system is fastened to the first tooling assembly fastener system. A second tooling assembly is provided with an ejection actuator, a fastener system and an alignment system. The second tooling assembly is mounted to a movable platen of the press. A second interchangeable mold block is provided with an ejector, a fastener system and an alignment system. The second interchangeable mold block alignment system is aligned with the second tooling assembly alignment system within a perimeter of the second interchangeable mold block. The second interchangeable mold block fastener system is fastened to the second tooling assembly fastener system.

A further embodiment discloses a method for molding an article by assembling a mold by providing a first tooling assembly with a manifold, a series of drops extending therefrom in fluid communication with the manifold, a fastener system and an alignment system. The first tooling assembly is mounted to a stationary platen of a press of an injection molding machine. The manifold is connected to a source of heated resin of the injection molding machine. A first interchangeable mold block is provided with a series of input apertures, a fastener system and an alignment system. The first interchangeable mold block alignment system is aligned with the first tooling assembly alignment system within a perimeter of the first interchangeable mold block, thereby also aligning the first interchangeable mold block input apertures with the first tooling assembly drops. The first interchangeable mold block fastener system is fastened to the first tooling assembly fastener system. A second tooling assembly is provided with an ejection actuator, a fastener system and an alignment system. The second tooling assembly is mounted to a movable platen of the press. A second interchangeable mold block is provided with an ejector, a fastener system and an alignment system. The second interchangeable mold block alignment system is aligned with the second tooling assembly alignment system within a perimeter of the second interchangeable mold block. The second interchangeable mold block fastener system is fastened to the second tooling assembly fastener system. The movable platen of the press is actuated such that the second interchangeable mold block is in engagement with the first interchangeable mold block. Heated resin is inserted into the first and second interchangeable mold blocks. The first and second interchangeable mold blocks are cooled. The movable platen of the press is actuated such that the second interchangeable mold block is out of engagement with the first interchangeable mold block. The ejection actuator is actuated to translate the ejector, thereby ejecting the molded article.

An even further embodiment discloses a method for interchanging a mold by assembling a mold by providing a first tooling assembly with a manifold, a series of drops extending therefrom in fluid communication with the manifold, a fastener system and an alignment system. The first tooling assembly is mounted to a stationary platen of a press of an injection molding machine. The manifold is connected to a source of heated resin of the injection molding machine. A first interchangeable mold block is provided with a series of input apertures, a fastener system and an alignment system. The first interchangeable mold block alignment system is aligned with the first tooling assembly alignment system within a perimeter of the first interchangeable mold block, thereby also aligning the first interchangeable mold block input apertures with the first tooling assembly drops. The first interchangeable mold block fastener system is fastened to the first tooling assembly fastener system. A second tooling assembly is provided with an ejection actuator, a fastener system and an alignment system. The second tooling assembly is mounted to a movable platen of the press. A second interchangeable mold block is provided with an ejector, a fastener system and an alignment system. The second interchangeable mold block alignment system is aligned with the second tooling assembly alignment system within a perimeter of the second interchangeable mold block. The second interchangeable mold block fastener system is fastened to the second tooling assembly fastener system. The first interchangeable mold block fastener system is unfastened from the first tooling assembly fastener system. The first interchangeable mold block is removed from the first tooling assembly. A third interchangeable mold block is provided with a series of input apertures, a fastener system and an alignment system. The third interchangeable mold block alignment system is aligned with the first tooling assembly alignment system within a perimeter of the third interchangeable mold block, thereby also aligning the third interchangeable mold block input apertures with the first tooling assembly drops. The third interchangeable mold block fastener system is fastened to the first tooling assembly fastener system. The second interchangeable mold block fastener system is unfastened from the second tooling assembly fastener system. The second interchangeable mold block is removed from the second tooling assembly. A fourth interchangeable mold block is provided with an ejector, a fastener system and an alignment system. The fourth interchangeable mold block alignment system is aligned with the second tooling assembly alignment system within a perimeter of the fourth interchangeable mold block. The fourth interchangeable mold block fastener system is fastened to the second tooling assembly fastener system.

BRIEF DESCRIPTION OF THE DRAWINGS

FIG. 4 is a partially exploded side elevation view of the interchangeable mold tooling assembly of FIG. 1;

DETAILED DESCRIPTION OF EMBODIMENTS

In response to the need to develop tooling to produce large commercial truck fascias with the material properties, the part complexity and the part pricing that is possible with the TIM process but with tooling costs that are approximately equal to the tooling costs for the RIM process, the interchangeable mold concept was developed. The embodiments of this invention enable the use of fully functional injection mold core and cavity blocks that are complete with all of the required material options, actions and features of the TIM process at a construction price that is approximately equal to the price of a RIM process mold.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis teaching one skilled in the art to variously employ the present invention.

Figure 3:
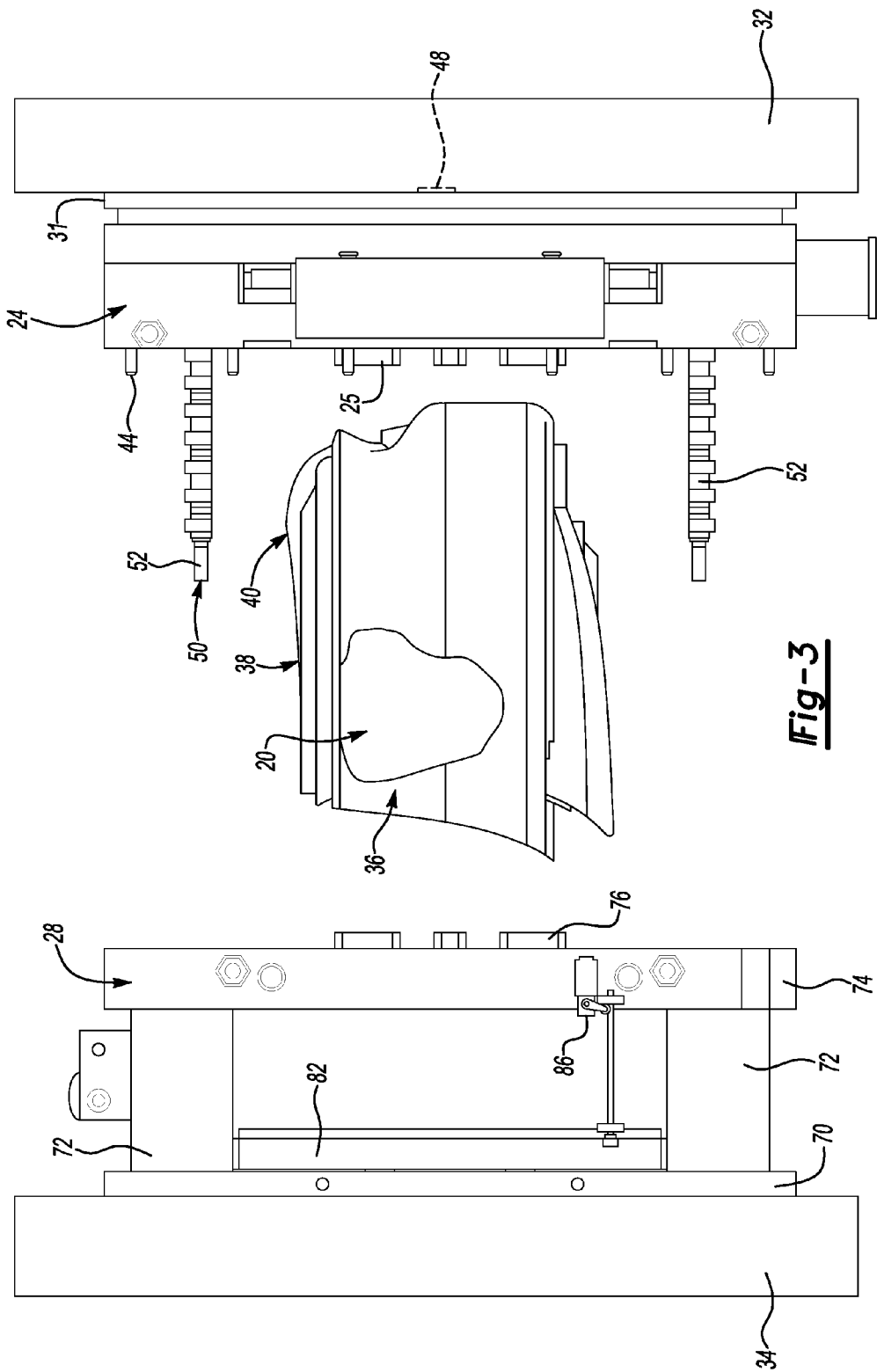
FIG. 3 is a side elevation view of the interchangeable mold tooling assembly and press of FIG. 2, illustrated with mold blocks of the interchangeable mold tooling assembly removed, and illustrated with a plurality of large molded articles, such as class 3 to 8 commercial truck bumper fascias, which are molded according to the present invention.

Referring initially to FIG. 3, a commercial truck bumper fascia is illustrated and referenced generally by numeral 20. The bumper fascia 20 is representative of a molded part that is relatively large, thereby requiring large mold blocks for accommodating the size of the part 20 while withstanding the pressures associated with molding the part 20. For example, commercial truck bumper fascias such as the bumper fascia 20 generally have a width that is eight feet, a height that is two feet and a depth that is three feet. Additionally, the wall stock thickness is typically about three to seven millimeters. Articles of this size typically require mold blocks formed from tool steel that may have a size (for example, 144" L×48" W×78" H), and weight (for example, approximately 75 tons), that require extremely large presses. Additionally, the size and weight of such mold blocks exceed the payload capacities of most plant handling equipment thereby limiting the flexibility and portability of the mold blocks as they are installed in an injection-molding machine. Additionally, the prior art mold blocks require dedicated tooling thereby further inhibiting the interchangeability of the part specific mold blocks. Further, articles such as the commercial truck bumper fascia 20 are run at a relatively low production volumes, thereby resulting in a large amortized cost for the blocks, tooling, press, labor and materials for changing out the mold blocks of one part for those of another part. Although a commercial truck bumper fascia is illustrated and described, the invention contemplates utilization of an interchangeable mold tooling assembly for any large injection molded product.

Recent developments for molding large Class "A" finish articles such as the commercial truck bumper fascia 20 have resulted in forming such articles 20 from a gas counter pressure foamed thermoplastic olefin (TPO). This process is disclosed in Assignee's Patent Application Ser. No. 61/039,489, titled METHOD OF MANUFACTURE OF A FOAMED CORE CLASS "A" ARTICLE, which was filed on Mar. 26, 2008, which is incorporated in its entirety by reference herein. The gas counter pressure foamed TPO molding process requires a very low mold clamping pressure (for example, 1200 tons), that is much less than that of prior art processes which requires higher clamping pressures (for example, 6000 tons), for the TIM process for a part of that size. Thus, a reduction in clamping force is permitted by the gas counter pressure foamed (TPO) process. The reduction in clamping force and molding pressure permits a reduction in the strength and the accompanying weight of the mold blocks. Specifically, lighter aluminum mold blocks can be utilized, instead of the heavier steel blocks, to suitably withstand the molding pressures and clamping force during the gas counter pressure foamed (TPO) process.

Aluminum mold blocks are adequate for containing all the features that are molded to a bumper fascia 20 as compared to a prior art steel block. Additionally, aluminum blocks cost less than tool steel blocks because the aluminum blocks are easier and faster to machine, which results in a reduced cost for manufacturing the mold blocks.

Figure 1:
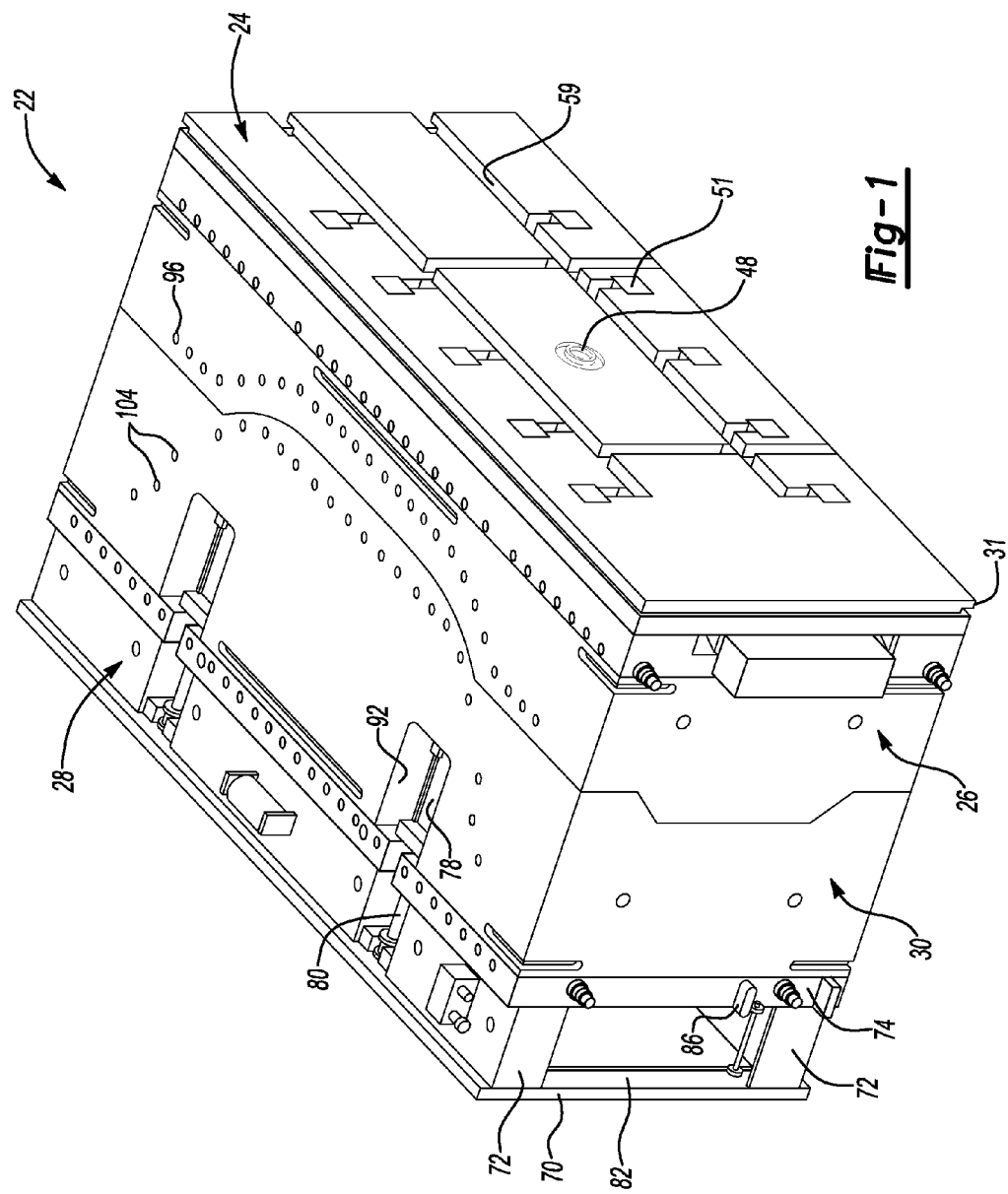
FIG. 1 is a perspective view of an interchangeable mold tooling assembly according to an embodiment of the present invention.

Referring now to FIG. 1, an interchangeable mold tooling assembly 22 is illustrated according to an embodiment of the present invention. The interchangeable mold tooling assembly 22 is utilized for molding the commercial truck bumper fascia 20 of FIG. 3. The interchangeable mold tooling assembly 22 includes a stationary tooling half 24, which is often referred to as a "hot half". A stationary mold block 26 is mounted to the stationary tooling half 24. The stationary mold block 26 is utilized for providing a forming surface for a class "A" part surface of the article 20. The class "A" surface is an exposed part surface or surface that is viewed externally when the article 20 is utilized for its end use. Since the article 20 is a commercial truck bumper fascia 20, the class "A" surface is the exterior surface of the bumper fascia 20 and therefore the stationary mold block 26 in this embodiment is a cavity block. The stationary tooling half 24 does not move because it contains the hot-runner manifold for receiving and distributing the heated resin to the mold cavity that forms the article 20.

The tooling assembly 22 also includes a movable tooling half 28, which supports a movable mold block 30. The movable tooling half 28 supports the movable mold block 30 and moves relative to the stationary mold block 26 for closing the mold blocks 26, 30 in the closed orientation of FIG. 1, and for opening for removal of a formed article 20. The movable tooling half 28 also includes an ejection system for ejecting the injection molded part from the movable mold block 30. The movable mold block 30 has a forming surface for forming a class "B" part surface and backside attachments. The class "B" surface is the surface that is concealed or not viewable in the end use of the product. In other words, the class "B" surface is the backside of the bumper fascia 20. The movable mold block 30 forms a class "B" surface and also any ancillary components on the surface including structural enhancements, mounting flanges and the like. The movable mold block 30 is shaped to mate with the cavity block 26 and includes a forming surface that extends forward as dictated by the shape of the article 20 and therefore the movable mold block 30 in this embodiment is a core block.

The mold blocks 26, 30 are formed from aluminum, which is lighter in weight than prior art steel blocks. Due to this reduced weight, the mold blocks, 26 and 30, can be supported by the respective tooling halves, 24 and 28. Further, as will be detailed below, the mold blocks 26, 30 are interchangeable from the tooling halves 24, 28. Mold blocks for other articles can be interchanged on the tooling halves 24, 28. Thus, the tooling halves 24, 28 can be reused for various other mold blocks for various articles.

It is common in various industries, such as the commercial truck industry for the original equipment manufacturer (OEM) to own the molds associated with their articles. Thus, in the prior art, an OEM for the bumper fascia 20 would own the mold blocks and the associated support tooling. However, in the tooling assembly 22 of the present embodiment, the tooling halves 24, 28 can be reused for various other blocks that are owned by either the same OEM or another OEM, and therefore the OEM would not be required to purchase tooling halves 24, 28 for each pair of mold blocks 26, 30, thereby providing the benefits of an injection molding process at a reduced cost to both the supplier and the various OEMs.

Figure 2:
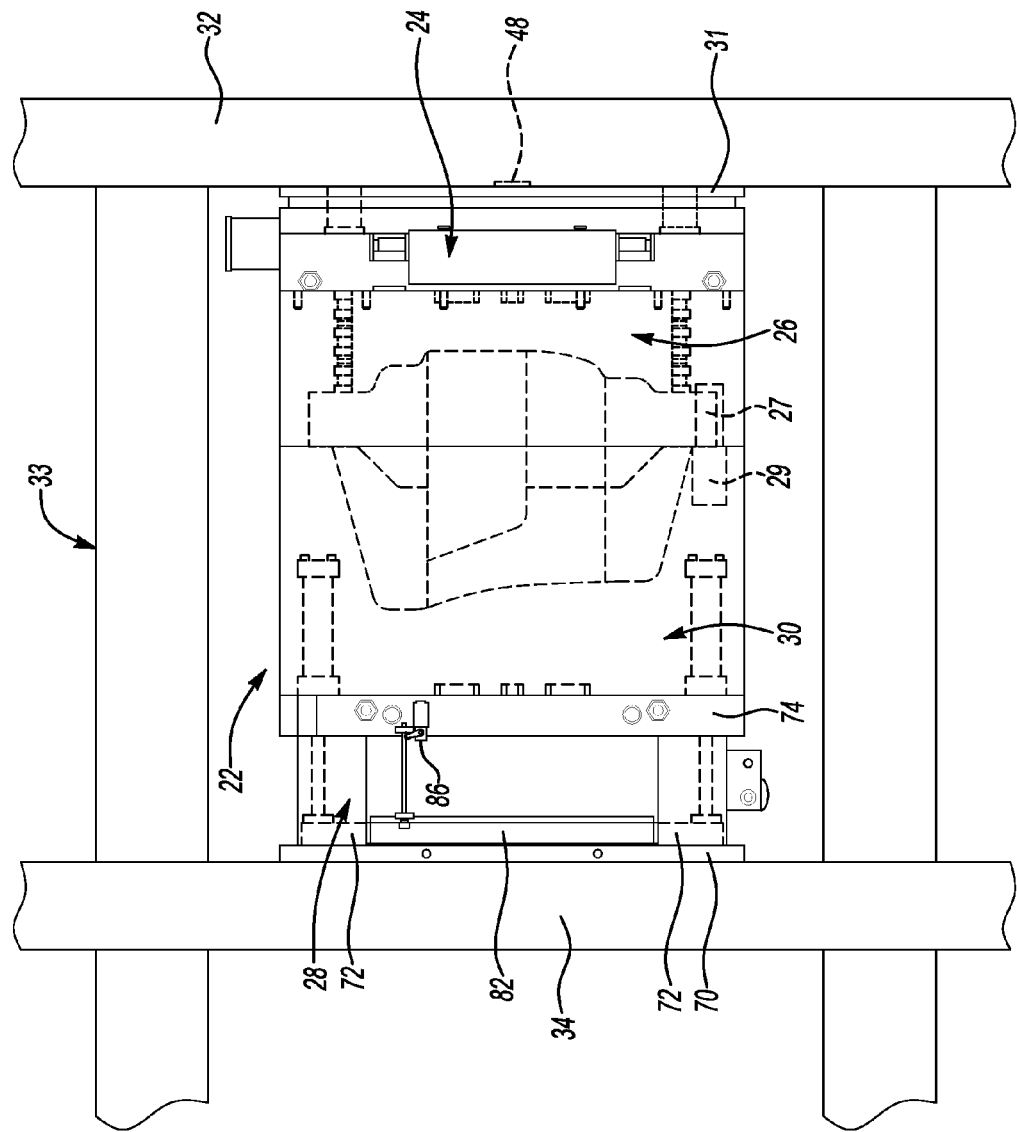
FIG. 2 is a side elevation view of the interchangeable mold tooling assembly of FIG. 1, illustrated in cooperation with a mold press.

Referring now to FIG. 2, the interchangeable mold tooling assembly 22 is illustrated installed into a press 33. The stationary tooling half 24 is mounted to a stationary platen 32 of the press 33 through which the heated resin is supplied to the stationary tooling half 24. The movable tooling half 28 is mounted to a movable platen 34 which moves for opening the mold blocks 26, 30 from the closed orientation in FIG. 2 for removing an article and then subsequently closing the mold by moving the core block 30 back into engagement with the cavity mold block 26.

Referring now to FIG. 3, the press 33 is illustrated with the stationary tooling half 24 mounted to the stationary platen 32 and the movable tooling half 28 mounted to the movable platen 34. In FIG. 3, the mold blocks 26, 30 have been removed for interchanging the blocks 26, 30 with another pair of blocks. The bumper fascia 20 is illustrated in combination with a plurality of other bumper fascias 36, 38, 40, which collectively provide a representative range of dimensions required by the market. By overlapping the various bumper fascias 20, 36, 38, 40, the stationary tooling half 24 and movable tooling half 28 are designed to be universal for mold blocks for any of these articles 20, 36, 38, 40 within the ranges required by the market.

FIG. 4 illustrates the complete tooling assembly 22 partially exploded with the cavity block 26 and the core block 30 disassembled from the stationary tooling half 24 and the movable tooling half 28. The stationary tooling half 24 includes a series of heated flow channels (drops) 52 for providing the molten foamed thermoplastic to the part cavity that is formed by the mated interchangeable cavity and core blocks 26, 30. A series of fasteners 44, such as air actuated knob and locking cylinders, are utilized for fastening and supporting each of the mold blocks such as cavity block 26 to the stationary tooling half 24 and the core block 30 to the movable tooling half 28. Of course, any suitable fastener system can be employed for mounting the blocks 26, 30 to the tooling halves 24, 28. In the embodiment depicted, a centrally located keyway system 25 is utilized for maintaining the alignment of the stationary tooling half 24 to the cavity block 26 and another keyway system 76 is used to align the dynamic core block 30 with the dynamic tooling half 28. As the aluminum mold blocks 26, 30 increase in temperature and expand at differential rates during the molding process, the keyway systems 25, 76 keep the mated blocks 26, 30 aligned.

The stationary tooling half 24 includes a hot runner manifold 46 for receiving the heated resin from the injection unit of the molding machine through a heated sprue-bushing 48 and through a clearance aperture in the stationary platen 32. The hot runner manifold 46 includes a series of electronically controlled valve gates 50 that are located within the drops 52 which are each permanently mounted within the stationary tooling half 24. In the depicted embodiment, the manifold 46 includes ten drops 52 with internal valve gates 50 for conveying and controlling the flow of heated resin to the mold runners of the mold blocks 26, 30 and the part cavity provided between the blocks 26, 30.

Referring again to FIG. 3, the collection of fascias 20, 36, 38, 40 permit a development of a suitable array of drops 52 with valve gates 50 to accept the largest and smallest bumper fascias known in the commercial truck market. The length of the drops 52 with valve gates 50 are designed to precisely interface with the steel drop aperture plates 53 (FIG. 5) of the mold blocks 26, 30 for any of these bumper fascias 20, 36, 38, 40. Each of the drops 52 interfaces with runner systems at the drop aperture plates 53 which are mounted at the parting line of the associated cavity and core blocks 26, 30. The stationary tooling half 24 may be constructed of any suitable material such as P20 tool steel in order to support and cooperate with various mold blocks. The stationary tooling half 24 contains four guide pins 42 that mate with four guide grooves 43 in cavity mold block 26, as shown in FIG. 6.

Figure 5:
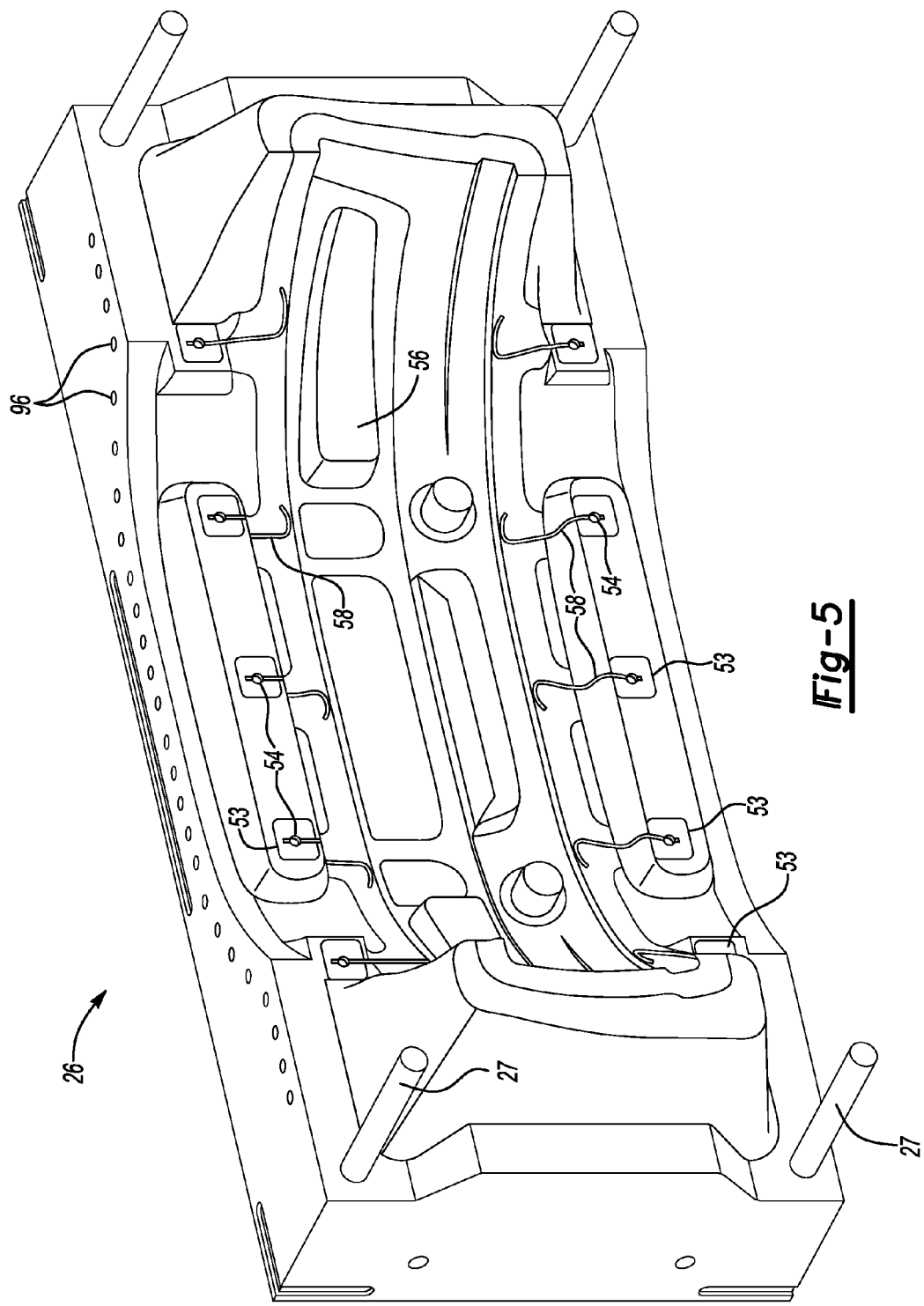
FIG. 5 is a perspective view of a cavity block of the interchangeable mold tooling assembly of FIG. 1.

Referring now to FIG. 5, the cavity mold block 26 is illustrated. The cavity mold block 26 includes a series of drop aperture plates 53 with drop apertures 54 that receive and seal the drops 52 at parting line and runner system 58 origins of the stationary tooling half 24. The cavity block 26 includes a forming surface 56 for forming the class "A" surface of the article 20. The cavity block 26 also includes a series of runner systems 58, each adjacent to a sealing drop aperture plate 53 that receives the nozzle of drop 52. The runner systems 58 convey the injected heated resin from the aperture 54 to an opening in the part cavity, known as a gate, which is provided at various locations between the cavity forming surface 56 of the cavity block 26 and an associated forming surface of the core block 30.

Figure 6:
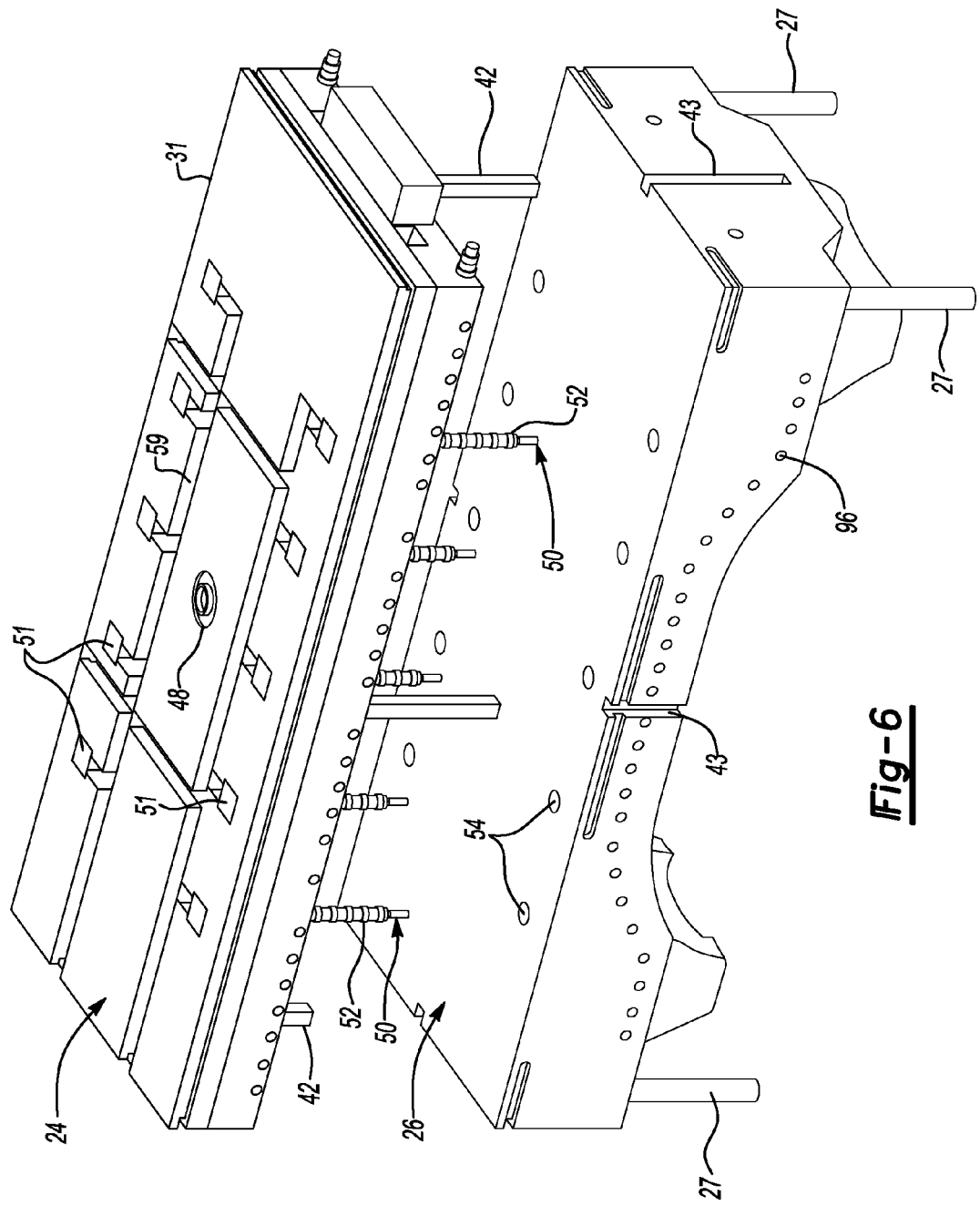
FIG. 6 is a partially exploded perspective view of the cavity block of FIG. 5 and a stationary tooling half of the interchangeable mold tooling assembly of FIG. 1.

Referring now to FIG. 6, the stationary tooling half 24 is illustrated disassembled from the cavity block 26. The stationary tooling half 24 includes the manifold injection spruebushing 48 for receiving the heated resin from molding machine injection unit 33 through the clearance aperture in the stationary platen 32 and conveying that heated resin to the hot runner manifold 46 which distributes the heated resin through the hot drops 52 to the valve gates 50. The stationary tooling half is also equipped with the four guide bars 42 that serve to provide initial alignment of the stationary tooling half 24, with its protruding hot drops 52, as the stationary mold block 26 is installed onto the stationary tooling half 24. By providing initial alignment before the drops 52 penetrate into the apertures 54 of the mold block 26, it is possible to eliminate the chance that the two components could make unwanted contact and possibly damage the hot drops 52. This view also shows the positioning of valve gate cylinders 51 as they are installed in a static mold clamp plate 31 as well as channels 59 that are used to provide electrical and hydraulic service to the hot drops 52 and valve gate cylinders 51.

FIG. 6 also illustrates assembly of the cavity block 26 to the stationary tooling half 24. The guide pins 42 are aligned with the guide slots 43 that are positioned on the outside surface of the stationary mold block 26. With this alignment, the hot drops 52 can safely fit inside of the apertures 54 on the back of the stationary mold block 26. With both pieces aligned, the stationary mold block 26, with its apertures 54 can now be joined with the stationary tooling half 24 thereby mating the hot drops 52 in the corresponding apertures 54. Thus, the stationary tooling half 24 acts as a slipper for receiving the various interchangeable mold blocks and enabling this assembly to provide melt flow to the mold cavity 56.

Unlike the prior art, the interchangeable mold block 26 is not constrained about its periphery. Rather, the guide pins 42 are provided within the perimeter of the cavity block 26. The grooves 43 may provide clearance inboard to accommodate varying rates of thermal expansion of the steel stationary tooling half 24 and the aluminum cavity block 26. The stationary tooling half 24 accommodates different rates of thermal expansion of the steel stationary tooling half 24 and the aluminum cavity block 26 with a system of centrally located keys 25 and keyways that align the blocks 26 as their mating surfaces are joined in the assembly process. This arrangement permits the aluminum cavity block 26 to expand without restrictions and still maintain full alignment with the steel stationary tooling half 24, thereby providing compatibility between the differing materials.

Figure 7:
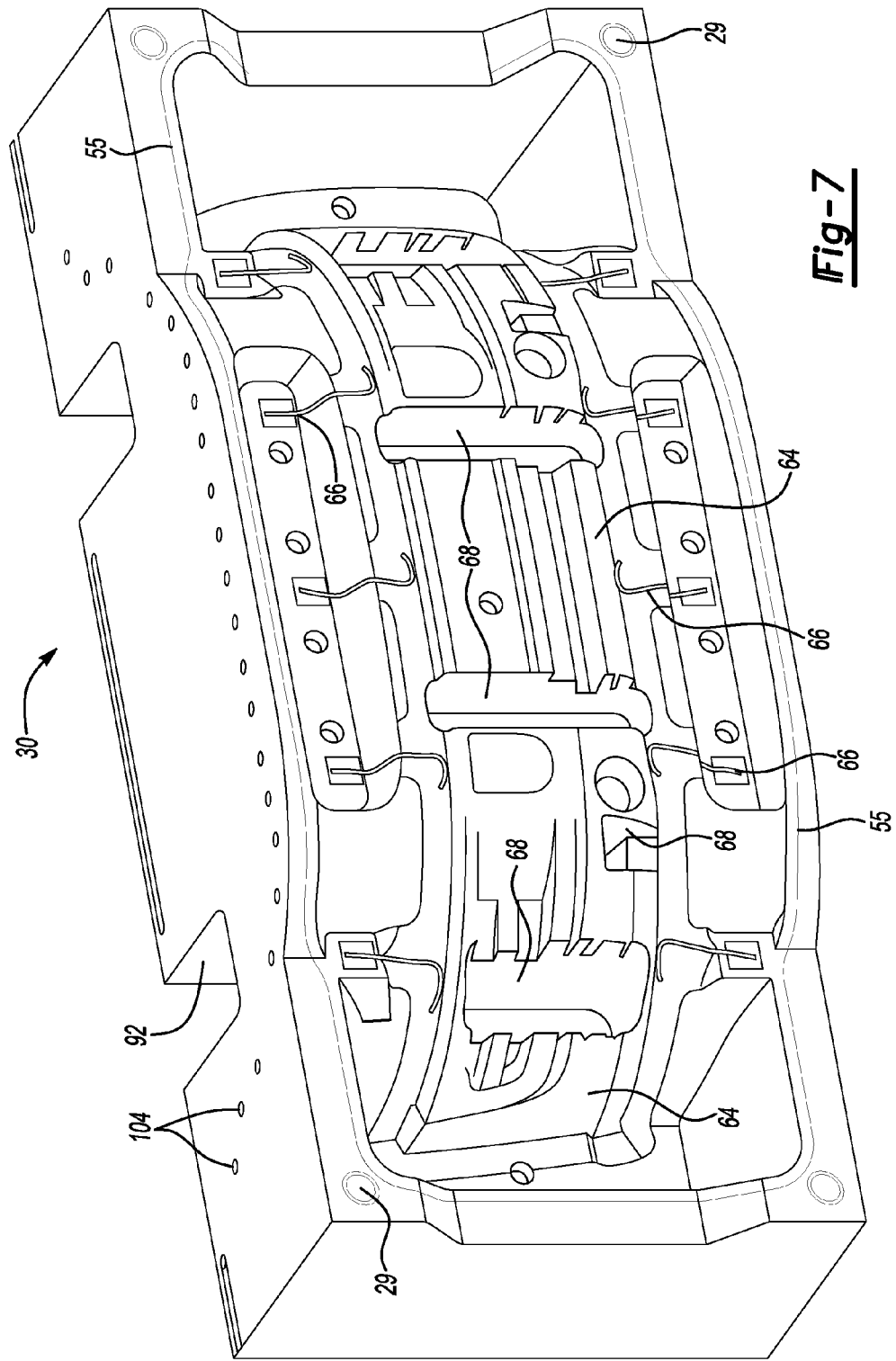
FIG. 7 is a perspective view of a core block of the interchangeable mold tooling assembly of FIG. 1.

Referring now to FIG. 7, the core block 30 that is illustrated has a forming surface 64 for forming the class "B" or backside surface of the article 22. The core block 30 parting line surface is matched to the cavity block 26 parting line surface so that when the core block 30 is moved to engage the cavity block 26, the two mold blocks 26, 30 provide a part cavity between the forming surface 56, 64 of the cavity block 26 and the core block 30. Additionally, runner systems 66 are provided on the core block 30 for permitting the molten resin, which exits the nozzles of hot drops 52 to flow through the runner systems 66 to the cavity between the forming surfaces 64, 56 for molding the article 20. Additionally, the core block 30 includes a series of recesses 68 for receiving ejection blocks (known as lifters but not shown), which each provide part of the forming surface 64 and are actuated for ejecting the article 20 from the core block 30 after the mold 20 has been opened. Also visible in FIG. 7 are four leader pin bushings 29 which receive leader pins 27 (FIGS. 5 and 6) that are mounted in the mold block 26 and serve to provide initial alignment of the mold blocks 26, 30 as they are moved together to seal the part cavity. Once they are together, the part cavity is made airtight by a parting line gas seal 55 (FIG. 8) to permit the injection and retention of the counter pressure gas.

Figure 8:
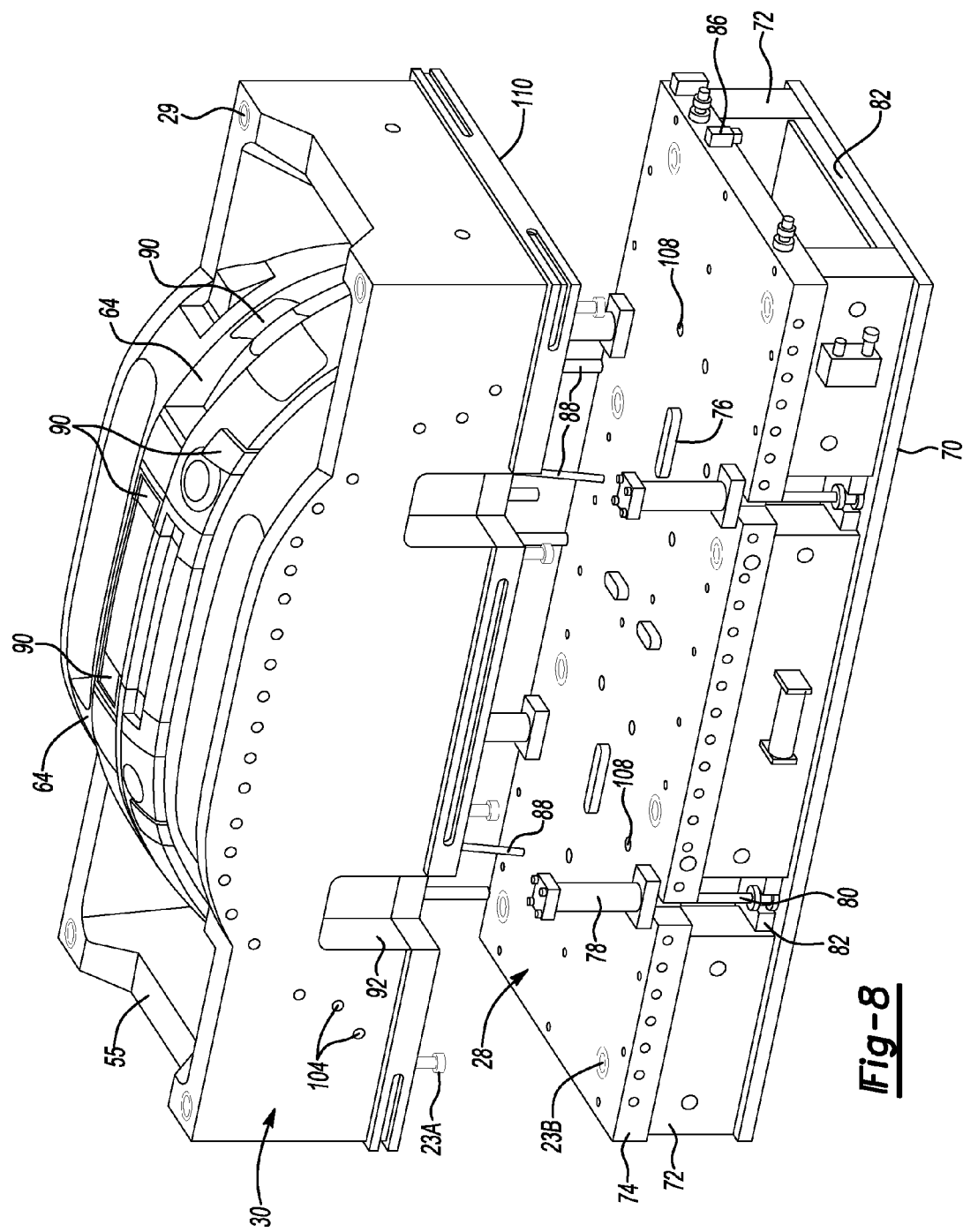
FIG. 8 is an exploded perspective view of the core block of FIG. 7 and a movable tooling half of the interchangeable mold tooling assembly of FIG. 1.

Referring now to FIG. 8, the movable tooling half 28 or ejector half is illustrated. The movable tooling half 28 has a first steel plate 70 for mounting directly to the movable platen 34 of the press 33. A series of steel intermediate support blocks 72 are mounted to the first plate 70 for supporting a block mounting plate 74. The series of centrally located keys 76 are provided on the mounting plate 74. The core block 30 is mounted directly to the mounting plate 74 and includes a series of keyways that receive the keys 76 for aligning the core block 30 with the mounting plate 74. A series of air actuated knob 23*a* and locking cylinder 23*b* fasteners 44 are located on the movable tooling half 28 of the tooling assembly 22 for fastening the core block 30 to the mounting plate 74.

A series of hydraulic cylinders 78 are mounted to the mounting plate 74 and each includes a shaft 80 that is mounted to an ejection plate 82. The hydraulic cylinders 78, which reside in clearance pockets 92 in the movable mold block 30, collectively retract the shafts 80 for transporting the ejection plate 82 towards the mounting plate 74. Transportation of the ejection plate 82 causes a series of ejection shafts 88 to extend through apertures 108 in the mounting plate 74. The ejection shafts 88 engage corresponding ejection lifter blocks 90 in the core block 30 and actuate the ejection lifter blocks 90 for ejecting the molded article 20 from the core block 30. A limit switch 86 is provided for detecting the position of the ejection plate 82. Although hydraulic cylinders are disclosed as an example, the invention contemplates any suitable actuator within the spirit and scope of the present invention.

FIG. 8 illustrates the core block 30 and the movable tooling half 28 exploded. The ejection shafts 88 are illustrated in FIG. 8 prior to installation within the apertures 108 of the mounting plate 74. The keys 76 are universal for aligning any of the core blocks such as the core block 30 within the designed ranges. The movable tooling half 28 provides a slipper for various interchangeable mold blocks.

FIG. 8 illustrates the movable tooling half 28 assembled prior to installation of the core block 30. The recesses 92 are provided in the core block 30 for providing clearance for the hydraulic cylinders 78. The ejection shafts 88 are illustrated prior to installation within the apertures 108 of the mounting plate 74. Likewise, the arrangement of the ejection shafts 88 is universal for engaging corresponding ejection shafts in the core block 30 for actuating ejection blocks 90 on the core block 30 forming surface 64. Similar to the cavity block 26 and stationary tooling half 24, the core block 30 and the movable tooling half 28 cooperate such that the core block 30 is not constrained about its periphery. The movable tooling half 28 provides a slipper for various interchangeable mold blocks. A series of air actuated knob 23A and locking cylinders 23B serve as fasteners 44 to fasten the movable tooling half 28 of the tooling assembly 22 to the movable core block 30.

The keys 76 are universal for aligning any of the core blocks for various articles such as the core block 30 within the designed ranges. By providing the keys 76 and fasteners within the perimeter of the core block 30, the core block 30 is permitted to expand relative to the movable tooling half 28 due to differing rates of thermal expansion of aluminum of the core block 30 and the P20 tool steel of the mounting components of the movable tooling half 28. Thus, unlike the prior art, the core block 30 is permitted to expand and shrink during the heating and cooling of the molding process.

Figure 9:
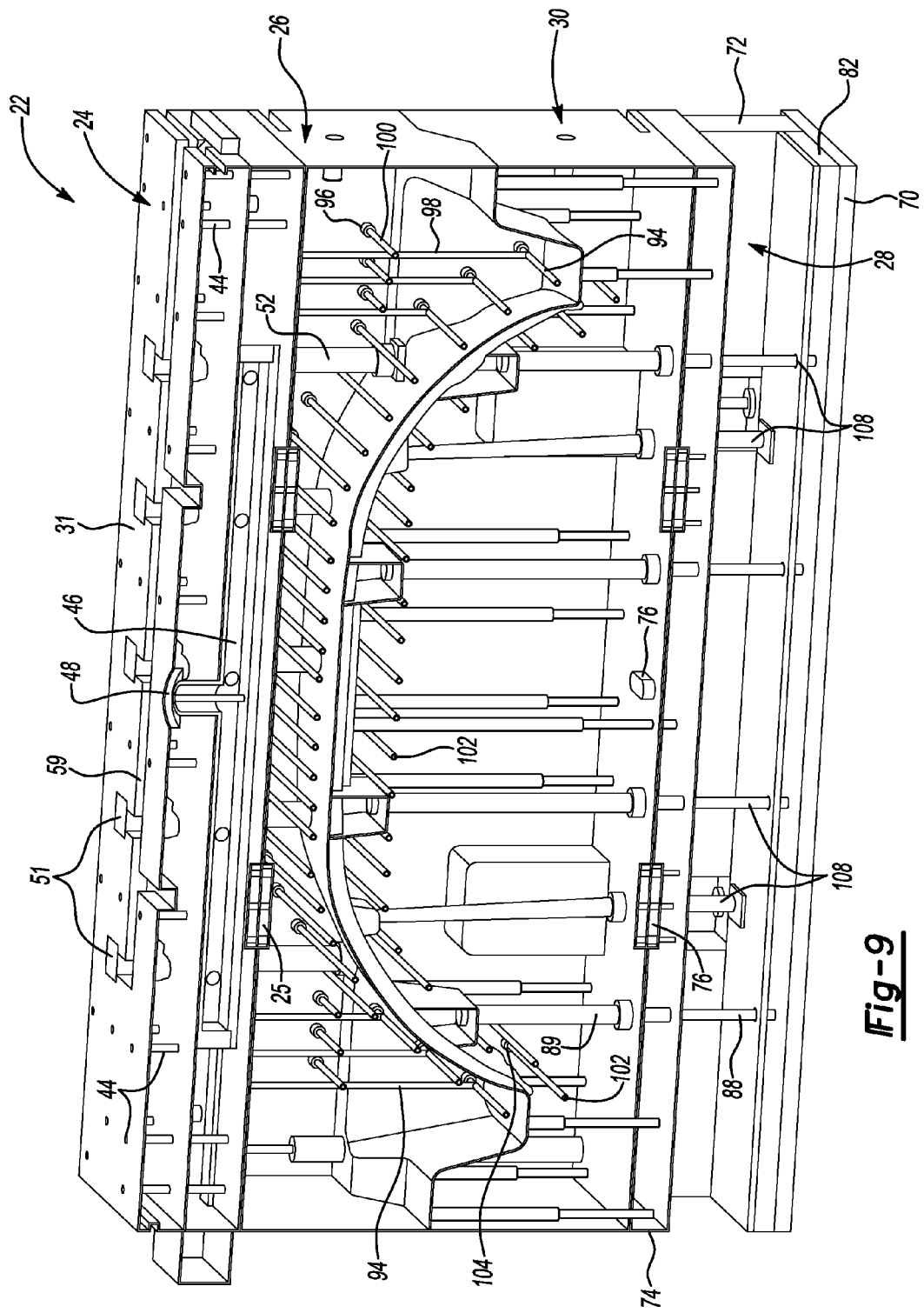
FIG. 9 is a perspective section view of the interchangeable mold tooling assembly of FIG. 1.

Referring now to FIG. 9, the interchangeable mold tooling assembly 22 is illustrated in a perspective section view for revealing internal components. Rather than utilizing hatch patterns, solid portions of the assembly 22 have been illustrated as transparent to reveal a perspective view of the internal components. The mold is illustrated in the closed position wherein the core block 30 engages the cavity block 26. The stationary tooling half 24 is illustrated with the manifold injection sprue-bushing 48 connected to the hot runner manifold 46 for receiving the heated resin and distributing the heated resin to the valve gate drops 52. The valve gated drops 52 convey the resin through the nozzles to the runner systems 58, 66 of the blocks 26, 30 and to the cavity provided between the forming surfaces 56, 64.

In order to achieve the maximum performance from the foamed TPO resin that is being injected into the mold and thereby to reduce deformities in the formed article 20, the mold may be uniformly heated or cooled, as necessary, prior to the injection of the heated foamed resin. Accordingly, a series of coolant channels 94 are each incrementally spaced about the forming surface 56 of the cavity mold block 26 and the forming surface 64 of the core mold block 30 for conveying a heating/cooling fluid therethrough. Each channel 94 may include a port 96 at the entry and at the exit of each tempering line in cavity mold block 26 and in the core mold block 30 for the installation of a supply line fitting (not shown). Supply and return hoses may be connected to the fittings 96 that convey the tempering fluid through the coolant channels 94. Some of the coolant channels 94 are formed in regions that do not extend outside the block 26 and therefore include an intermediate channel 98 that intersects the channel 94 in an offset channel 100. The port 96 is utilized in the offset channel 100 and fluid is conducted through the offset channel 100 through the intermediate channel 98 and to the coolant channel 94. The exposed ends of the coolant channel 94 are plugged and the upward portion of the intermediate channel 98 is plugged to control the path of the coolant. Upon entering the channel at the port 96 for channel 100, the tempering fluid typically proceeds through a section of channel 96, a section of channel 98, a section of channel 94, another section of channel 98 and then exits the system through another section of channel 100 to port 96.

Instead of providing an individual supply of tempering fluid to each port 96 and fitting for each of the coolant channels 94, each of the fluid supply lines may be permanently connected to a collective fluid manifold. A fluid manifold may be provided on the exterior of the stationary cavity mold block 26 so that the tempering fluid can be conveyed from the stationary fluid manifold, mounted on the exterior of mold block 26, to the individual fittings at the tempering channel ports 96 of the cavity block 26 without requiring connection and disconnection of multiple hoses to the fittings and the cavity block 26 with every interchange of the mold blocks. Instead of disconnecting and reconnecting a multitude of individual tempering fluid lines at the interchange of the cavity mold block 26, the tempering connections can be accomplished by disengaging and reengaging a series of two trunk fluid lines with quick-change fittings.

Similarly, the core block 30 also includes a series of tempering channels 102 spaced incrementally about the forming surface 64 of the core block 30. Ports 104 are provided on each end of the core block 30 for receiving fittings for connecting hoses for conveying fluid through the tempering channels 102. Alternatively, the tempering channels 102 may each be routed to the movable core mold block 30. The movable core mold block 30 may be provided with a manifold for providing the fluid to the tempering channels 102 thereby eliminating the need to connect and reconnect hoses to fittings at their ports 104 when interchanging tool blocks 30. As in the case of the cavity mold block 26, instead of disconnecting and reconnecting a multitude of individual tempering fluid lines at the interchange of the core mold block 30, the tempering connections can be accomplished by disengaging and reengaging a series of two trunk fluid lines with quick-change fittings.

The stationary tooling half 24 is illustrated with the series of centrally located keys 25 and the movable tooling half 28 is illustrated with the series of centrally located keys 76 mounted on the mating surface of mounting plate 74, to engage the respective centrally located keyways in the mating surface of the stationary cavity mold block 26 and to engage the centrally located keyways in the mating surface of the movable core mold block 30. Additionally, the core block 30 is illustrated with the series of ejection pin apertures 108 that are each aligned with one of the ejection shafts 88 of the movable tooling half 28. Retraction of the shafts 80 of the hydraulic cylinders 78 lifts the ejection plate 82, which transports the ejection shafts 88 through ejection pin-apertures 108 thereby extending the ejection blocks 90 from their pockets 68 within the core block 30 above the core block surface 64 to eject the molded part 20 from the surface 64 of the core mold block 30.

Figure 10:
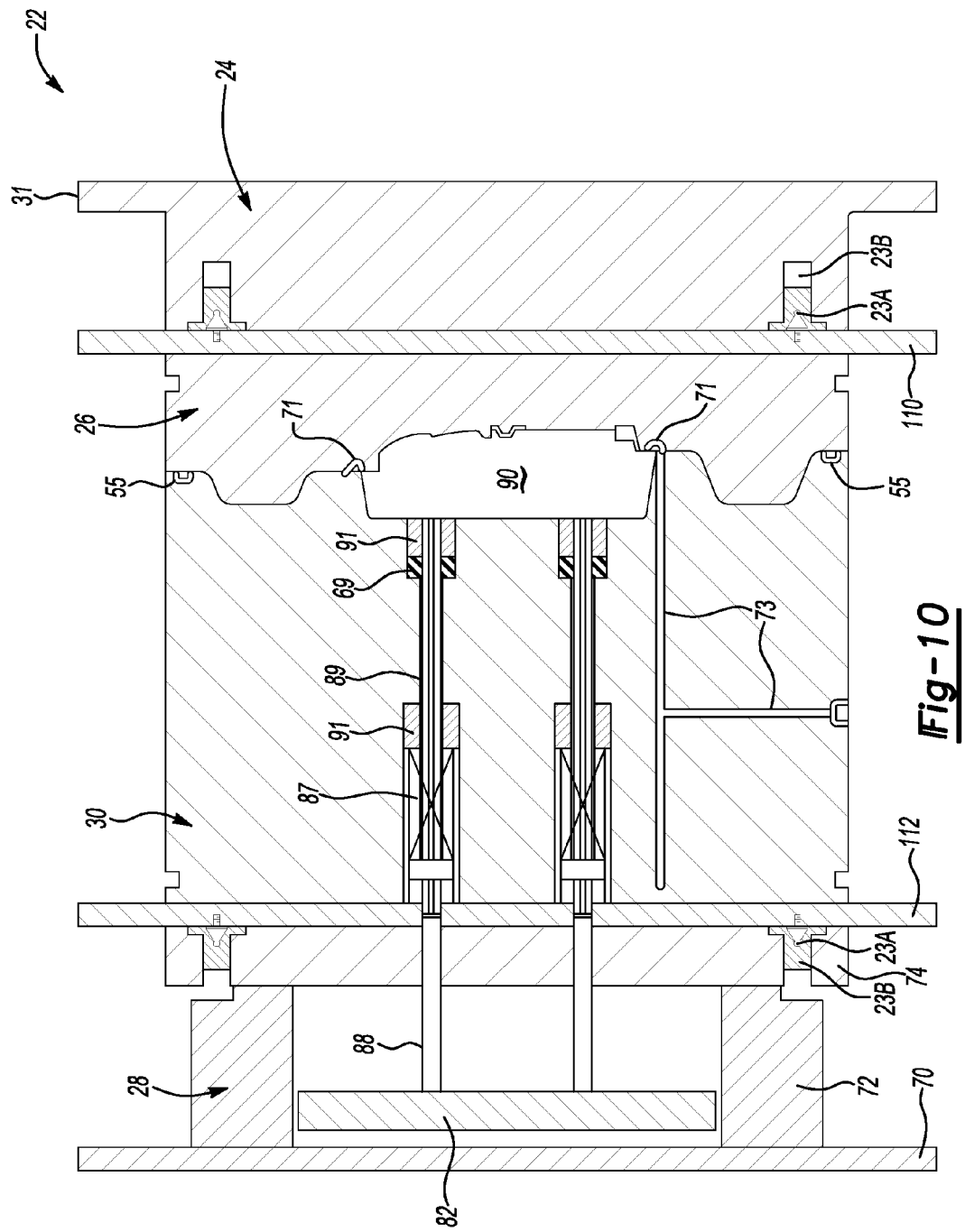
FIG. 10 is a side section view of the interchangeable mold tooling assembly of FIG. 1.

Referring to FIG. 10, gas is introduced into the cavity 56 of the mold tooling assembly 22 during the counter-pressure process, prior to the injection of the molten resin; and the pressure of the gas is maintained during the injection of the molten resin. In order to contain the pressure of the gas, annular shaft seals 69 are installed at every opening that could permit the gas to escape from the part cavity 56. These seals 69 are therefore employed for the pass-through apertures of ejector pins and core pins that connects the closed part cavity, through the mold block 30, to the outside ambient atmosphere. Additional provisions can be made to seal the part cavity 56 from the outside ambient atmosphere by encircling the part cavity 56 with a system of the replaceable seal beads 55 which are installed into the parting line surface 56 of the mold runoff. With the part cavity 56 completely sealed and capable of supporting the internal gas pressure, a series of gas channels 71 can be utilized, which are connected to gas supply ports 73 through apertures in the mold block 26 and which are used to introduce the gas into the part cavity 56, to a specified pressure, and then to evacuate that same gas from the filled part cavity 56 after the resin injection process is complete.

Figure 11:
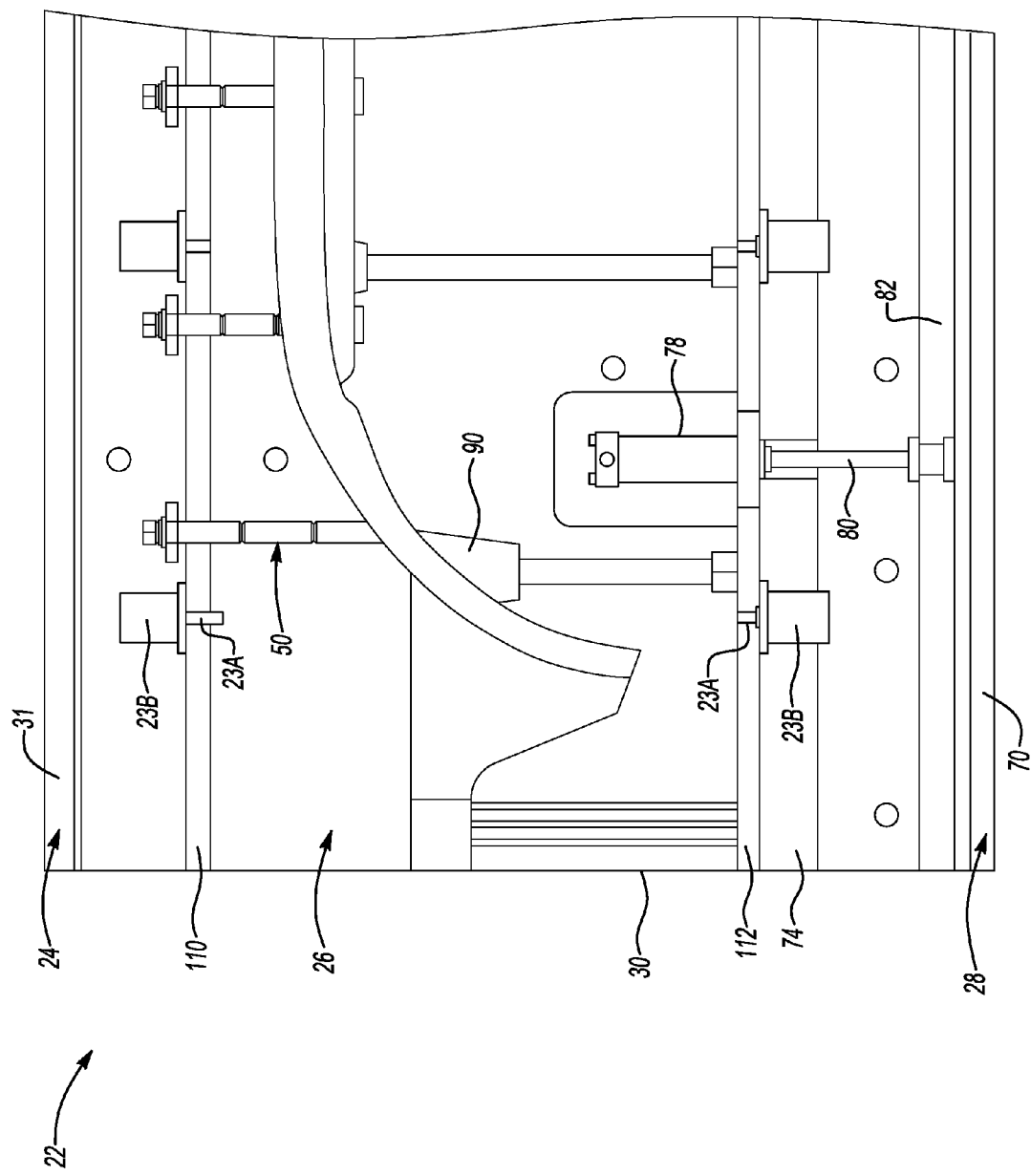
FIG. 11 is a top plan view of the interchangeable mold tooling assembly of FIG. 1.

FIGS. 10 and 11 illustrate tooling features for expeditious removal of one set of mold blocks 26, 30 from the respective tooling half 24, 28. This mold design incorporates the interlocking system of knobs 23A and pneumatic cylinder locks 23B by the firm of Edward D. Segen & Company LLC of Fort Laramie, Ohio. All four tooling/mold units 24, 26, 28, 30 can be equipped with the respective components of a system of pneumatically operated mating knob 23A and locking cylinder 23B quick release clamps, consisting of the knob 23A and the pneumatically operated locking cylinder 23B for each of the fastening locations. All of the mating knob 23A and locking cylinder 23B fastening mechanisms for attaching the stationary tooling half 24 and the cavity mold block 26 to each other are actuated by a series of pneumatic lines which are plumbed in parallel and powered from a centrally located air supply that is located on the stationary tooling half 24. In like manner, the movable tooling half 28 and the core block 30 are fastened together with a similar system of mating knob 23A and pneumatically operated locking cylinder 23B quick release clamps, consisting of the mating knob 23A and the pneumatically operated locking cylinder 23B for each of the fastening locations. All of the mating knob 23A and locking cylinder 23B fastening mechanisms for attaching the movable tooling half 28 and the cavity mold block 30 to each other can be actuated by a series of pneumatic lines which are plumbed in parallel and powered from a centrally located air supply that is located on the stationary tooling half 24.

By design, the pneumatically operated locking cylinder 23B is normally fully engaged and locked by means of an internal spring mechanism and is only able to release the captured knob 23A when pneumatic pressure is applied to the cylinder 23B to counteract the internal spring mechanism thereby permitting the jaws of the locking cylinder 23B to open and release the mating knob 23A. The locking cylinders 23B can also be equipped with electronic position sensors to ensure that the locking jaws of the cylinders are either open or closed and engaged.

The application of the mating knob 23A and pneumatically actuated locking cylinder 23B system, on the mold assembly 22 for the part 20 of this size, can be designed with the mating knob 23A locations on a backing plates 110 of the cavity mold block 26 and, for some embodiments, on a backing plate 112 of the core mold blocks 30, to align with the locations of the locking cylinders 23B on the stationary tooling half 24 and the movable tooling half 28. In order to simplify and thereby expedite a mold block exchange procedure, standardized location patterns can be adopted for the movable mold blocks 30 that are different from standardized location patterns for the stationary mold blocks 26.

The cylinder locks 23B are typically installed into a steel component of the mold 22 such as the base plate 74 of the ejector system or movable tooling half 28 and the static tooling half 24 to provide a solid support for these locking devices 23B. In order to provide firm continuity of support, the clamping knobs 23A are installed into a series of threaded apertures in each of the steel mold block backer plates 110, 112 for the cavity mold block 26 and for the core mold block 30. These mold block backer plates 110, 112 are fastened to the aluminum mold blocks 26, 30 with a series of screws and dowels to provide a robust mounting surface and foundation for the stud threads of the quick release knobs 23A. These mold block backer plates 110, 112 also provide a durable wear surface to protect the relatively soft metal of the aluminum mold blocks 26, 30 during the repeated impacts and abrasions that occur during multiple exchanges of the mold blocks 26, 30 while supporting the production demand of a variety of different parts 20, 36, 38, 40.

A further manifestation of the interchangeability of this mold design can be found in the modular approach to activation of the lifter 90 upon part ejection. Typically, prior art production molds use ejection systems that are integrally installed in the ejector plate and are either solid shafts that act as ejector pins or as rods that are solidly connected to the lifter blocks that reside in lifter pockets which have been machined into the core surface of the mold. In the case of the mold design of at least one embodiment, the interchangeability feature is further enhanced by two-piece ejector shafts. Each shaft system consists of the driver shaft 88 and a slave shaft 89. The slave shaft 89 is the longer portion of the ejection system that is connected to the lifter block 90 that pushes the molded part 20 off of the core of the mold 30. The slave shaft 89 is mounted in a set of lubricated bushings 91 for directional accuracy and is spring loaded by ejector springs 87 for consistent return travel when the driver shaft 88 is retracted by the ejector plate 82. The driver shaft 88 of this system mates with the exposed end of the slave shaft 89 and is pushed into operation as the ejector plate 82 advances forward to eject a completed part 20. The driver shaft 88 is solidly mounted into the ejector plate 82 that resides on guide pins (not shown) within the movable tooling half 28 of the mold assembly 20. Locations of the driver shafts 88, the apertures 108 and the lifters 90 are standardized and duplicated for all other parts that may molded using those tooling halves 24, 28 or others for their unique mold blocks, thereby resulting in flawless mating of the driver shafts 88 of the ejector box 28 with the slave shafts 89 of the original core block 30 as well as those of any further core blocks 30.

The tooling assembly 22 disclosed herein provides an interchangeable tooling assembly 22 that is advantageous for injection molding a number of different large foamed thermoplastic, such as TPO, components such as commercial truck bumper fascias, and permits interchangeability of the mold blocks 26, 30 that mate and cooperate with universal stationary tooling half 24 and movable tooling half 28 for each of the different components. Substantial costs are saved in the manufacture of the unique mold blocks 26, 30, only, for each of the different customer part designs. An additional source of cost savings can be found by installing the customer-unique mold blocks onto the vendor owned equipment, i.e., the stationary tooling half 24 and movable tooling half 28, and reusing that same equipment for multiple sets of customer-unique mold blocks. Further cost savings can be achieved in the change-out of the blocks 26, 30, which can be interchanged within the press 33 due to their dimensional and feature commonality. Due to the reduced weight of the blocks 26, in comparison to prior art blocks for components of this size, the blocks 26, 30 can be changed within the press 33 by conventionally available plant equipment such as overhead cranes and forklifts, depending on the size of the article being produced and the respective mold size.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The features of various implementing embodiments may be combined to form further embodiments of the invention.

What is claimed is:

1. A tooling assembly with an interchangeable mold block, the tooling assembly comprising:
   a tooling body having a first surface adapted to be mounted to a platen of a press of an injection molding machine and a second surface that is opposed from the first surface and adapted for receiving an interchangeable mold block mounted thereto;
   a series of fasteners mounted on the second surface for fastening the mold block thereto;
   an alignment system having at least one first guide bar or guide groove mounted on the second surface of the tooling body for aligning the mold block to the tooling body, the alignment system being oriented at and within a perimeter of the mold block to permit expansion of the mold block relative to the tooling body to accommodate varying rates of thermal expansion of the tooling body and the mold block;
   the interchangeable mold block capable of forming an article, and comprising:
   a mold block body having a first surface adapted to be mounted to the tooling body second surface, a second surface of the mold block body that is opposed from the mold block body first surface for engaging another mold block body, and a forming surface for collectively forming an article with a forming surface of the other mold block body in a forming operation;
   a second series of fasteners mounted on the mold block body first surface for fastening the mold block body to the tooling body second surface; and
   a second alignment system having at least one second guide bar or guide groove mounted on the mold block body first surface for cooperating with the first guide bar or guide groove and aligning the mold block to the mold tooling assembly, the alignment system being oriented at and within a perimeter of the mold block body to permit expansion of the mold block body relative to the mold tooling assembly to accommodate varying rates of thermal expansion of the mold tooling assembly and the mold block body.

2. The tooling assembly of claim 1 wherein the body includes a manifold for fluid communication with the injection molding machine for receiving heated resin therefrom; and
   wherein the tooling assembly further comprises a series of drops extending from the second surface in fluid communication with the manifold for receiving the heated resin from the manifold and conveying the heated resin to the mold block.

3. The tooling assembly of claim 2 further comprising a series of electronically controlled valve gates oriented in the tooling body, each in fluid communication between the manifold and one of the series of drops for regulating and metering the distribution of the heated resin through the drops and consequently to the mold.

4. The tooling assembly of claim 1 wherein the alignment system further comprises centrally oriented keys or keyways.

5. The tooling assembly of claim 1 further comprising an ejection system for ejecting a molded article from the mold block.

6. The tooling assembly of claim 1 wherein the tooling body further comprises:
   a first plate providing the tooling body first surface;
   a plurality of supports mounted to the first plate;
   a second plate mounted to the plurality of supports spaced apart from the first plate, the second plate providing the tooling body second surface;

a plurality of actuators mounted to the tooling body; and
an ejection plate disposed between the first plate and the second plate and connected to the actuators to be translated by the actuators for driving an ejector in the mold block.

7. The tooling assembly of claim 6 further comprising a series of ejector shafts mounted to the ejection plate for driving the ejector in the mold block.

8. The tooling assembly of claim 6 wherein a plurality of apertures are formed through the second plate to receive ejection shafts from the mold block therethrough such that the ejection plate engages the ejections shafts for actuating the ejection shafts for ejecting a molded article from the mold block.

9. The tooling assembly of claim 1 wherein the series of fasteners further comprise a series of locking cylinder actuators for receiving and locking a corresponding series of knobs that are mounted to the mold block for fastening the mold block to the tooling body.

10. The tooling assembly of claim 1 wherein the tooling assembly body includes a manifold for fluid communication with the injection molding machine for receiving heated resin therefrom; and
wherein the tooling assembly further comprises a series of drops extending from the second surface in fluid communication with the manifold for receiving the heated resin from the manifold and conveying the heated resin to the mold block; and
wherein the interchangeable mold block further comprises a series of plates, each with an aperture formed therethrough, each plate oriented adjacent the forming surface for receiving one of the series of drops for receiving the heated resin between the forming surfaces of the mold blocks.

11. The tooling assembly of claim 10 wherein the tooling body is further defined as a first steel tooling body;
wherein the interchangeable mold block is further defined as a first aluminum interchangeable mold block;
wherein the tooling assembly further comprises:
a second steel tooling body having a first surface adapted to be mounted to a second platen of the press and a second surface that is opposed from the first surface and adapted for receiving a second interchangeable mold block mounted thereto,
a second series of fasteners mounted on the second tooling body second surface for fastening the second mold block thereto,
a second alignment system mounted on the second tooling body second surface for aligning the second mold block to the second tooling body, the second alignment system being oriented within a perimeter of the second mold block to permit expansion of the second mold block relative to the second tooling body to accommodate varying rates of thermal expansion of the second tooling body and the second mold block, and
a second aluminum interchangeable mold block for forming the article, comprising:
a second mold block body having a first surface adapted to be mounted to the second tooling body second surface, a second surface of the second mold block body that is opposed from the second mold block body first surface for engaging the second surface of the first mold block body, and a forming surface for collectively forming the article with the forming surface of the first mold block body in the forming operation,
a series of fasteners mounted on the second mold block body first surface for fastening the second mold block body to the second tooling body second surface, and
an alignment system mounted on the second mold block body first surface for aligning the second mold block to the second mold tooling assembly, the alignment system of the second mold block being oriented within a perimeter of the second mold block body to permit expansion of the second mold block body relative to the second mold tooling assembly to accommodate varying rates of thermal expansion of the second mold tooling assembly and the second mold block body; and
wherein the first and second interchangeable mold blocks are sized to form a class three to class eight commercial truck bumper fascia that is approximately eight feet in width, two feet high and three feet in depth with a thickness of about three to about seven millimeters.

12. The tooling assembly of claim 1 wherein the tooling assembly body further comprises:
a first plate providing the tooling body first surface;
a plurality of supports mounted to the first plate;
a second plate mounted to the plurality of supports spaced apart from the first plate, the second plate providing the tooling body second surface;
a plurality of actuators mounted to and extending away from the second plate; and
an ejection plate disposed between the first plate and the second plate and connected to the actuators to be translated by the actuators for driving an ejector in the mold block;
wherein a plurality of recesses are formed in the mold block each oriented for providing clearance for one of the actuators.

13. The tooling assembly of claim 1 wherein the second series of fasteners further comprise a series of knobs; and
wherein the first series of fasteners further comprise a series of locking cylinder actuators that are sized to receive and lock the knobs thereto.

14. The tooling assembly of claim 1 further comprising:
at least one ejector shaft mounted to the mold block body for translation relative to the mold block body upon actuation by an actuator on the mold tooling assembly; and
at least one lifter block mounted in a recess of the mold block body and providing part of the mold block body forming surface, the at least one lifter block being connected to the at least one ejector shaft so that translation of the at least one ejector shaft translates the at least one lifter block for ejecting a molded article from the mold block body.

15. A method for assembling a mold comprising:
providing a first tooling assembly with a manifold, a series of drops extending therefrom in fluid communication with the manifold, a fastener system and an alignment system having first guide bars or guide grooves;
mounting the first tooling assembly to a stationary platen of a press of an injection molding machine;
connecting the manifold to a source of heated resin of the injection molding machine;
providing a first interchangeable mold block with a series of input apertures, a fastener system and an alignment system having second guide bars or guide grooves;
aligning the first interchangeable mold block alignment system with the first tooling assembly alignment system with the first guide bars or guide grooves cooperating with the second guide bars or guide grooves at and within a perimeter of the first interchangeable mold block, thereby also aligning the first interchangeable mold block input apertures with the first tooling assembly drops;

fastening the first interchangeable mold block fastener system to the first tooling assembly fastener system;

providing a second tooling assembly with an ejection actuator, a fastener system and an alignment system having third guide bars or guide grooves;

mounting the second tooling assembly to a movable platen of the press;

providing a second interchangeable mold block with an ejector, a fastener system and an alignment system having fourth guide bars or guide grooves;

aligning the second interchangeable mold block alignment system with the second tooling assembly alignment system with the third guide bars or guide grooves cooperating with the fourth guide bars or guide grooves at and within a perimeter of the second interchangeable mold block; and fastening the second interchangeable mold block fastener system to the second tooling assembly fastener system.

16. A method for molding an article comprising:
assembling a mold according to the method of claim 13;
actuating the movable platen of the press such that the second interchangeable mold block is in engagement with the first interchangeable mold block;
inserting heated resin into the first and second interchangeable mold blocks;
heating or cooling the first and second interchangeable mold blocks;
actuating the movable platen of the press such that the second interchangeable mold block is out of engagement with the first interchangeable mold block; and
actuating the ejection actuator to translate the ejector, thereby ejecting the molded article.

17. A method for interchanging a mold comprising:
assembling a mold according to the method of claim 15;
unfastening the first interchangeable mold block fastener system from the first tooling assembly fastener system;
removing the first interchangeable mold block from the first tooling assembly;
providing a third interchangeable mold block with a series of input apertures, a fastener system and an alignment system having fifth guide bars or guide grooves;
aligning the third interchangeable mold block alignment system with the first tooling assembly alignment system with the first guide bars or guide grooves cooperating with the fifth guide bars or guide grooves at and within a perimeter of the third interchangeable mold block, thereby also aligning the third interchangeable mold block input apertures with the first tooling assembly drops;
fastening the third interchangeable mold block fastener system to the first tooling assembly fastener system;
unfastening the second interchangeable mold block fastener system from the second tooling assembly fastener system;
removing the second interchangeable mold block from the second tooling assembly;
providing a fourth interchangeable mold block with an ejector, a fastener system and an alignment system having sixth guide bars or guide grooves;
aligning the fourth interchangeable mold block alignment system with the second tooling assembly alignment system with the second guide bars or guide grooves cooperating with the sixth guide bars or guide grooves at and within a perimeter of the fourth interchangeable mold block; and
fastening the fourth interchangeable mold block fastener system to the second tooling assembly fastener system.

* * * * *

UNITED STATES PATENT AND TRADEMARK OFFICE
CERTIFICATE OF CORRECTION

| | | |
|---|---|---|
| PATENT NO. | : 8,128,394 B2 | Page 1 of 1 |
| APPLICATION NO. | : 12/934738 | |
| DATED | : March 6, 2012 | |
| INVENTOR(S) | : Brian L. Desmith | |

It is certified that error appears in the above-identified patent and that said Letters Patent is hereby corrected as shown below:

Column 17, Line 24, Claim 16:

After "the method of claim" delete "13" and insert -- 15 --.

Signed and Sealed this
First Day of May, 2012

David J. Kappos
*Director of the United States Patent and Trademark Office*